Patented Oct. 24, 1933

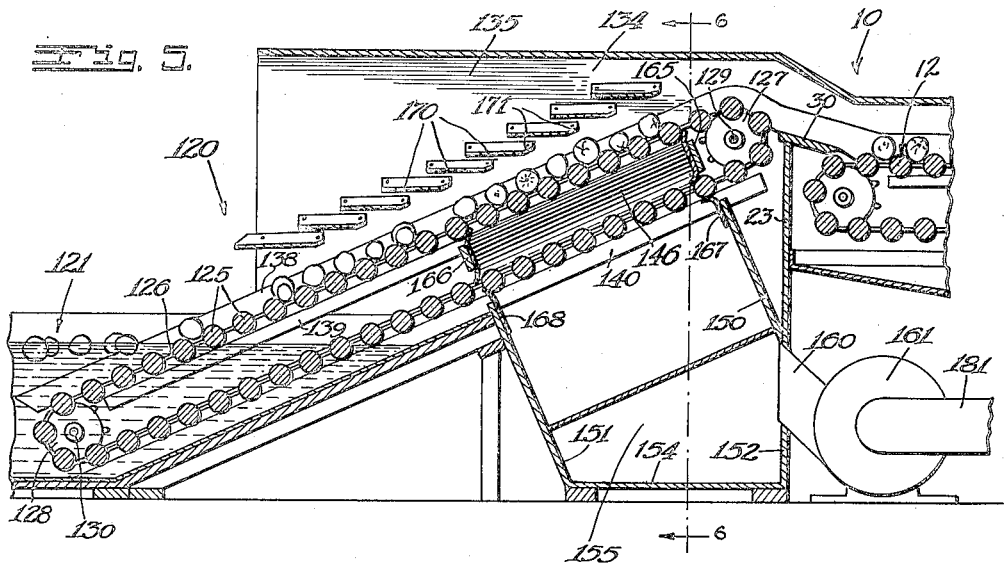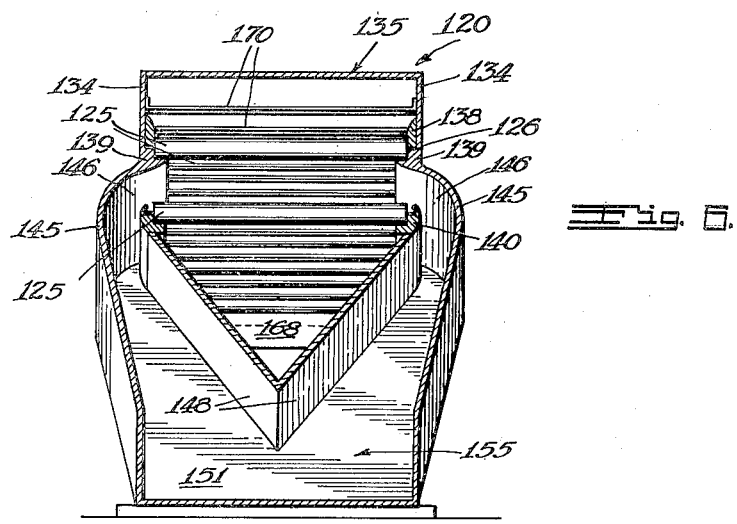

1,932,124

UNITED STATES PATENT OFFICE 1,932,124

DRIER AND SORTING TABLE

William J. Tobey, Placentia, Calif.

Application February 7, 1931. Serial No. 514,155

3 Claims. (Cl. 34—12)

My invention relates to fruit and vegetable handling equipment and particularly to a novel conveyer and drier.

In the marketing of many species of fruits and vegetables the produce is taken from the farm to a packing house where it is cleaned, graded, sized and packed for shipment. Large scale commercial operations of this kind frequently are carried out by continuous processes requiring washers, driers, sorting tables, sizers and the like through which the produce is carried in a continuous stream during treatment.

It is an object of my invention to provide an improved means for conveying fruit and other farm produce to effectively present it for drying or other treatment in various steps of a continuous packing process.

While applicable to many kinds of farm produce the principles of my invention are especially well illustrated by its specific use in an orange packing house and the preferred embodiment of my invention disclosed herein will accordingly be described in connection with this use.

After being washed, oranges usually are passed through a drier for removing the moisture. Hitherto the driers in general use for this purpose have been large and relatively inefficient roller driers which have involved a very inefficient application of air to the oranges as they are conveyed through a housing.

In the drying of oranges it is advantageous to present the entire surface of the fruit to the action of the drying medium. In the sorting of fruit according to grade it is also useful to present the entire surface of the fruit to the eye of the sorter, as the fruit is sorted by surface characteristics.

It is accordingly another object of my invention to provide a device for handling fruit such as oranges so as to present all faces of the fruit in a given direction to expedite the performance of a given step in the packing process.

The manner of accomplishing the foregoing objects as well as further objects and advantages will be made manifest in the following description taken in conjunction with the accompanying drawings, in which:

Fig. 1 is a plan view of a preferred embodiment of the invention partly broken away to illustrate its construction.

Fig. 2 is a longitudinal sectional view taken on the line 2—2 of Fig. 1.

Fig. 3 is a transverse sectional view taken on the line 3—3 of Fig. 2.

Fig. 4 is a fragmentary diagrammatic view illustrating a modified form of roller adapted to be embodied in the invention.

Fig. 5 is a longitudinal vertical sectional view of an elevator for delivering fruit from a treating tank to my drier and a means of blowing water from said fruit while on said elevator.

Fig. 6 is a cross sectional view taken on the line 6—6 of Fig. 5.

Referring specifically to the drawings, the illustrated embodiment of my invention is in the form of a drier 10 having a housing 11 in which are provided primary and secondary conveyers 12 and 13 for carrying fruit through the housing. Associated with the housing 11 for the purpose of applying air to this fruit is a blower 14.

The housing 11 includes side walls 20 to which are secured legs 21 which support the housing. The housing also has end walls 23 and 24, an intermediate wall 25 and a top wall 26. The end walls 23 and 24 have inlet and outlet openings 28 and 29 which are provided respectively with fruit runways 30 and 31. The intermediate wall 25 has a drop board 35 mounted upon its upper edge and cooperates with a pair of flags 36 and 37 hanging from the top wall 26 to divide the space in the housing 11 into a primary drying chamber 40 and a secondary drying chamber 41 in which the conveyers 12 and 13 respectively are mounted. Disposed downwardly from the chambers 40 and 41 are housing openings 42 and 43, while disposed upwardly from these chambers are housing openings 44 and 45.

The conveyer 12 is an endless conveyer comprising two chains 50 trained over sprockets 51 and 52, these chains having pin links between which rollers 53 are pivotally mounted. In the horizontal flights of the conveyer 12 the rollers 53 are supported and roll on tracks 54 and 55. The sprockets 51 and 52 respectively are mounted on shafts 57 and 58 which are journalled in suitable bearings in the housing 11 the shaft 58 having a sprocket 59 for the purpose of driving the conveyer 12.

The conveyer 13 is disposed at a slightly lower level than the conveyer 12 as shown in Fig. 2 and includes a pair of chains 60 trained over sprockets 63 and 64 which are mounted on shafts 65 and 66 which journal in suitable bearings in the housing 11. Provided on the shaft 66 is a sprocket 67 which is adapted to have a chain 68 trained thereover for driving the conveyer 13. The shaft 65 has a sprocket 69 which is connected to the sprocket 59 by a chain 70, for the purpose of driving the conveyer 12.

siderable economy in the amount of power used to move the air in drying the fruit.

The flags 36 and 37 are sufficiently heavy to prevent a draft of air from the chamber 40 into the chamber 41 which obviously would be undesirable owing to the fact that the air in the chamber 40 is heavily laden with moisture whereas it is desired that the air applied to the fruit in the chamber 41 be as dry as possible. Most of the air entering the chamber 41 therefore comes through the opening 29 in the wall 24. This causes a considerable draft on the fruit carried on the right hand end of the conveyer 13 which is about to be discharged onto the runway 31. In case the heating elements 114 are in operation, the air entering through the opening 29 is heated, which will increase the drying action taking place in this chamber.

The flag 111 is allowed to hang down only when the heating elements 114 are being used, in which case this flag permits fruit to be discharged down the fruit runway 31, but prevents cold air being drawn into the chamber 41.

While the drier 10 comprises a preferred embodiment of my invention it does not illustrate all the uses to which the elements thereof may be put in the drying of fruit or in the handling of this during the various packing operations. For instance, where fruit is not wet enough to require any initial elimination of excess water, it may be found advantageous to connect the pipe 96 to the discharge end of the blower 14 and the intake end of this blower to the atmosphere so that dry air is impelled upwardly into the chamber 41 with the result that this air is expelled upwardly in relatively thin jets from between adjacent rollers 75 onto fruit carried on these rollers. As the conveyer 13 would probably be used in this manner only where there were no drops of water on the fruit which might be whipped therefrom, the entire drying action would be by evaporation which would be very effective owing to the narrow jets of air directed upwardly through the spaces between adjacent rollers 75 against the fruit carried thereon.

Owing to the fact that all faces of the fruit carried on the conveyer 13 are presented to view because of its constant rotation and lateral shifting to and fro, the conveyer 13 is adapted to be used for sorting purposes. In fact, it might even be used for drying and sorting purposes at the same time, wherever it is not necessary that the fruit picked from the conveyer be entirely dry when removed. In either case, where it is desired to use the conveyer 13 as a sorting conveyer, the cover 93 is removed from the place in which it is shown and sorters are stationed alongside the conveyer 13 to pick out a certain grade of fruit which it is desired to eliminate from the run.

Referring now to Figs. 5 and 6, an elevator 120 is here shown which is adapted to lift fruit from a treating tank 121 and deliver this onto the fruit runway 30 of the conveyer 12. The elevator 120 is of the inclined endless rotating roller type and has rollers 125 rotatably supported between a pair of chains 126 which are trained over sprockets 127 and 128 mounted respectively on shafts 129 and 130. The shaft 129 is journalled in suitable bearings provided on side walls 134 of a housing 135, for the elevator 120. Suitable means (not shown) are provided for rotating the shaft 129 for driving the elevator 120. The shaft 130 is journalled in suitable bearings provided in the tank 121. The upper flight of the elevator 120 is provided with fruit guide members 138 and chain and roller tracks 139 which are rigidly secured to the housing side walls 134. The lower flight of the conveyer is provided with chain guides and roller tracks 140.

Lower portions 145 of the side walls 134 bulge outwardly to form passageways 146 around the outside of the guides 140. Extending downwardly from the guides 140 are a pair of inwardly inclined walls 148 which meet at their bottom edges and cooperate with the side wall portions 145, with walls 150 and 151, with a downward extension 152 of the drier wall 23, and with a floor 154 to form an air chamber 155 which is in closed communication with the passages 146.

Opening into the chamber 155 is an exhaust pipe 160 of a blower 161. The blower 14 may be used for this purpose or the fan 161 may be an additional blower also extracting air from the air chamber 141 of the drier 10. In case the blower 14 is used to perform the functions of the blower 161, the blowing of air downwardly into the air chamber 40 would of course have to be omitted. This manner of operation is not preferable, but may be followed where a maximum drying capacity is not needed, as in the warmer seasons of the year.

Disposed between the upper and lower flights of the conveyer 120 are walls 165 and 166 having flexible flaps thereon which engage the rollers 125 to prevent air expelled upwardly from the chamber 155 through the passages 146 from leaking longitudinally between the conveyer flights. Flaps 167 and 168 are provided upon upper edges of walls 150 and 151 respectively, these flaps preventing leakage of air from the space between the walls 148, 150 and 151 so that air discharged form the passage 146 will not pass downwardly between the rollers 125 in the lower flight of the elevator 120.

It is thus seen that air discharged by the blower 161 into the chamber 155 will pass upwardly through the passage 146 into the space between the conveyer flights and, following the least line of resistance, will flow upwardly between the rollers 125 in the upper conveyer flight.

Mounted between the housing walls 134 is a staggered series of pans 170 which are substantially horizontally placed, with rear edges overlapping the pan therebelow and with the forward edge of each pan provided with a slightly upturned lip 171.

The operation of the drying elevator 120 is as follows:

The blower 161 is driven by any suitable power means (not shown) to draw air through an intake pipe 180, which is preferably connected to the chamber 41 of the drier 10, and expel this air through the exhaust pipe 160 into the chamber 155. This air, as previously described, is forced upwardly between rollers 125 as these carry fruit upwardly through the housing 135. The air thus escaping between the rollers 125 whips drops of water from the surface of fruit resting on the rollers and these drops are blown upwardly against the pans 170. These pans are slightly inclined rearwardly, so that water adhering to either the bottoms or the top surfaces of the pans will run toward the depressed edges of the pans and fall therefrom into the pans disposed therebelow. Thus all drops of water coming in contact with the pans 170 eventually drain from the lowermost pan into the tank 121. In this manner water loosely adhering to the surface of the fruit carried upwardly on the elevator 120 is removed therefrom so as to greatly increase the effectiveness of the drier 10 in its task of completely drying the fruit.

Oct. 24, 1933.  E. WOODWARD  1,932,125
COFFEEPOT
Filed Aug. 12, 1932
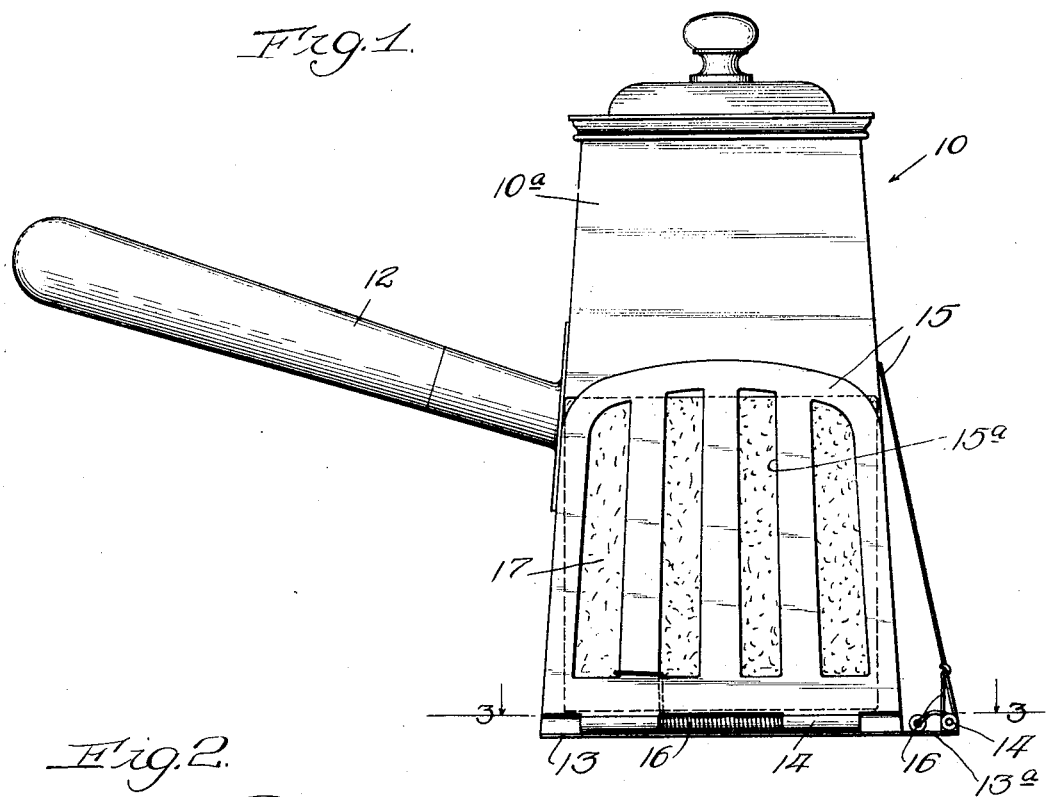
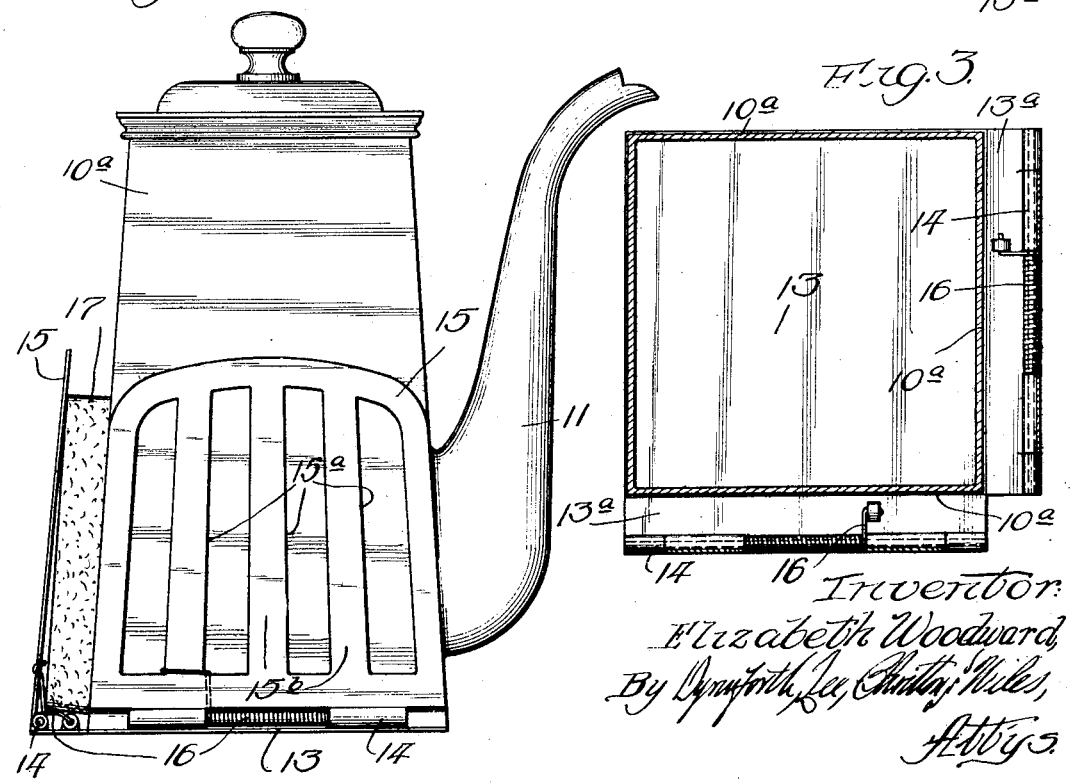

What I claim is:

1. In an apparatus for handling fruit, the combination of: a housing having an opening disposed upwardly; a fruit conveyer including a series of rotating rollers adapted to travel across said opening and conveying and rotating fruit thereover, adjacent rollers having interfitting nodes and necks and being separated by relatively narrow spaces; and means for extracting the air from said housing to cause a semi-vacuum therein and a constant flow of air around said fruit and between said rollers into said housing.

2. In an apparatus for handling fruit, the combination of: a housing; a conveyer for receiving wet fruit in one end of the housing; a second conveyer onto which said first conveyer delivers said fruit; flag means for dividing the space over said conveyers; means for drawing air from the space above said second conveyer through the second conveyer and forcing this air downwardly through said first conveyer, said second conveyer having an endless belt of transversely disposed rollers, the upper flight of which extends entirely across said housing; and means in said housing for forming air passages around the sides of the lower flight of said conveyer.

3. In an apparatus for handling fruit, the combination of: a housing; a conveyer for receiving wet fruit in one end of the housing; a second conveyer onto which said first conveyer delivers said fruit; flag means for dividing the space over said conveyers; means for drawing air from the space above said second conveyer through the second conveyer and forcing this air downwardly through said first conveyer, said second conveyer having an endless belt of transversely disposed rollers, the upper flight of which extends entirely across said housing; and lateral projections in said housing for forming air passages around the edges of the lower flight of said conveyer.

WILLIAM J. TOBEY.